INVENTORS.
Manuel Tama and
Wilbur E. Shearman
BY

United States Patent Office 3,092,682
Patented June 4, 1963

3,092,682
SUBMERGED RESISTOR TYPE INDUCTION FURNACES AND METHODS AND PROCESSES THEREFOR
Manuel Tama, Morrisville, and Wilbur E. Shearman, Yardley, Pa., assignors to Ajax Magnethermic Corporation, Youngstown, Ohio, a corporation of Ohio
Filed Mar. 24, 1960, Ser. No. 17,312
13 Claims. (Cl. 13—29)

Our invention relates to the melting of metals in induction furnaces and more particularly to an improved method and/or apparatus for melting metals in twin coil induction furnaces of the submerged resistor type.

The term "twin coil furnace" has been explained in the United States Letters Patent No. Re. 22,602, granted to Mario Tama on February 13, 1945.

Such furnaces consist of two principal parts with distinct functions, viz., the hearth and the submerged resistor. In many cases one hearth is used with a plurality of submerged resistors attached thereto. All the electrical energy is converted into heat inside of the submerged resistor while cold metal is charged into the hearth. Since these two parts are adjacent but at a definite distance from each other, it is important to transfer the heat generated in the submerged resistor as rapidly as possible to the hearth, where the energy is required to bring the cold metal from the solid state to the liquid state.

In the past it has been recognized that the maintenance of a unidirectional flow of the liquid metal in the submerged resistor channels of an induction furnace is highly beneficial and various efforts have been made to direct the flow in the channels in a unidirectional manner; however, certain deficiencies under high power requirements and in the melting of metals of higher melting point have been found in the various prior art proposals, viz., local superheating in the melting channels and premature lining failure.

The present invention broadly consists of an improved apparatus and method for melting metals in a twin coil induction furnace which consists of moving molten metal from the hearth first at a low temperature through the central channel and then back into the hearth at a relative higher temperature through the lateral channels, said central and lateral channels having substantially straight sides and being of substantially uniform cross section throughout the major portion of their length.

We have discovered that, contrary to prior teaching, the improved flow pattern in our present invention is reversed from the direction indicated in prior art patents and publications, the metal moving from the hearth into the central channel and out of the lateral channels back into the hearth.

The improved flow pattern is beneficial for the proper operation of the furnace because the central channel has less space for heat insulation than the lateral channels, so that higher temperatures can be tolerated in the lateral channels and lower temperatures are desirable in the central channel.

We have also discovered that when the central and lateral channels are each substantially of the same cross section throughout a major portion of their lengths the overall velocities are increased as compared with the prior art.

We have found that in induction furnaces of the twin coil type there is a concentric magnetic field in the central channel and an eccentric magnetic field in the lateral channels. The term "concentric magnetic field" signifies a field with a center at or very near to the geometrical center of the cross section of the channel and located at equal distances from the adjacent primary coils. The term "eccentric magnetic field" signifies a field with a center outside of the geometrical center of the cross section of the channel and is disposed away from the adjacent primary coil.

We have discovered that due to the different nature of the magnetic fields in the various channel portions of twin coil furnaces there is a natural tendency for the molten metal to flow in the manner described above (from hearth into central channels and out of lateral channels back into hearth) and that utilizing that natural tendency produces the most efficient flow pattern. This natural tendency can only be utilized to its highest efficiency if the molten metal path does not encounter forces causing movement in the opposite direction; in other words it is important to prevent "bucking" of the different forces because otherwise, overheating of the metal in certain parts of the melting channels will occur.

We have also discovered that when the melting channels change in cross section that tendency for the metal to flow at the point of transition from a small cross section into a large cross section is increased when the change in cross section is abrupt and decreased when the change in cross section is gradual.

We have further discovered that when such improved unidirectional flow is achieved and the flow patterns thereof properly utilized, uniformity of operating temperatures (elimination of "hot spots") and overall reduction of said temperatures in the melting channels result.

It is an important object of this invention to eliminate the existing inequality of temperature distribution in the various channels of inductors of the type described and to be able to increase the power input and to further increase the operative capacity of the furnace in ratio to the power input.

Another object of this invention is to increase the reliability and the life of the refractory linings of the submerged resistor induction furnaces.

A still further object is to attain a greater velocity of molten metal flow.

Another object of our invention is to obtain in the central channels of twin coil induction furnaces lower temperatures than in the lateral channels.

Another object of our invention is to enlarge the range of application of the submerged resistor type induction furnaces to cover high temperature melting metals.

Other objects of our invention and the invention itself will become more readily apparent by reference to the description which follows in which description reference will be made to the accompanying drawings.

Figure 1:
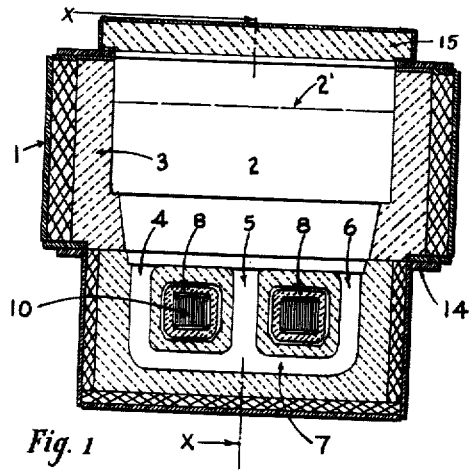
FIGURES 1 and 2 are vertical sectional views of improved induction melting furnaces showing two different variants of the channel design used in our invention.
Figure 2:
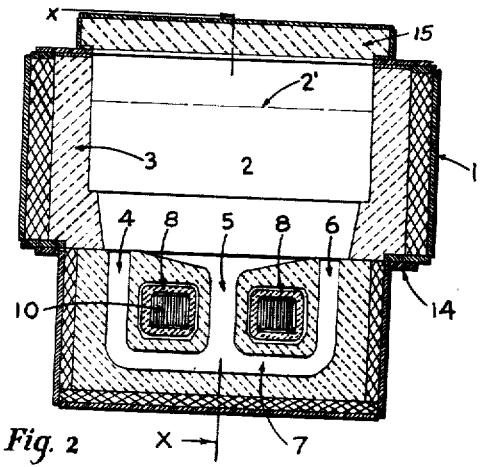

Referring now to the drawings, in all of which like parts are designated by like reference characters, it will be noted that the general construction of the furnace of the present invention is similar to submerged resistor twin coil furnaces of customary design. A lengthy description of the principle of operation is, therefore, believed to be unnecessary. The principal parts in FIGURES 1 and 2 are a housing 1, comprising a hearth 2 and a submerged resistor twin coil unit attached thereto. The hearth is adapted to hold the bulk of a charge of metal to be melted up to the level 2' and is lined with refractory material 3. In the particular designs chosen to illustrate this invention a submerged resistor unit is provided with two loops (twin coil furnace); therefore, three substantially parallel channels 4, 5 and 6 are provided which connect the hearth with the channel portion 7.

The transformer assembly comprises in the embodiments illustrated, two coils of insulated copper wire which in operation are connected to a current supply source, such as a single phase supply source of standard frequency alternating current, not shown. In the drawings, these coils are denominated by the numeral 8. An iron core 10, threads the primary winding and is closed in itself from both sides of the furnace. The transformer assembly is contained in a housing 12 to which a current of air may be passed by a blower 13 for cooling purposes.

The submerged resistor unit is fastened to the hearth unit by bolts attached to the flange 14.

The furnace has a removable cover 15.

Referring now to FIGURE 2, which is a preferred form of our invention, it will be noted that the lateral channels 4 and 6 are longer than the central channel 5 and that the connection between the hearth 2 and the central channel 5 is in the form of a wide funnel, so that the change of cross section between the hearth and the central channel is more gradual than in the form of our invention shown in FIGURE 1.

The novel features of the furnace comprise the design and arrangement of the melting channels and the use of a principle of operation distinguished from the "electromagnetic pumping" or "pinch effect" described in many prior art patents and publications.

In the embodiment of FIGURE 2 described above the contour of the zone leading from the hearth 2 into the central channel 5 is more gradual than that of the zone leading from the central channel 5 into the connecting channel 7.

Figure 4:
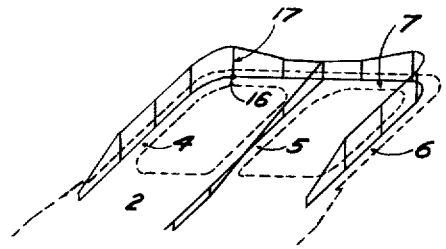
FIGURES 4 and 5 are isometric outlines of the channel forms of FIGURES 1 and 2 with the corresponding temperature patterns superimposed thereto.
Figure 5:
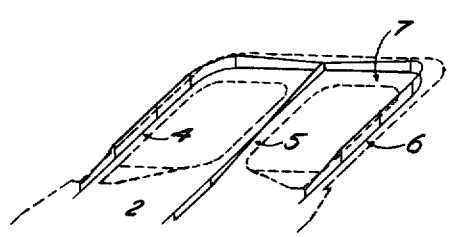
Figure 10:
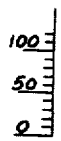
FIGURE 10 is a scale for measuring the temperature patterns of FIGURES 4, 5 and 8.

FIGURES 4 and 5 are isometric temperature patterns. Each figure shows an isometric outline of the channel form as the abscissa and the corresponding temperature as the ordinate. For instance, the length of line 17 (FIGURE 4) shows the temperature prevailing at point 16 of the connecting channel 7. The hearth 2, and the channels 4, 5, 6 and 7 are shown in a horizontal position. The temperatures shown are the amounts by which the hearth temperature was exceeded. A scale for reading this temperature difference at any given point is in FIGURE 10. This scale applies to FIGURES 4, 5 and 8.

It can be seen from FIGURES 4 and 5 that in the two embodiments of the invention described above the lowest temperature prevails in the central channel. From there on there is a gradual increase of temperature towards the outlet of the lateral channels into the hearth.

FIGURE 5 shows the temperature patterns which correspond to the embodiment described above in connection with FIGURE 2. The increase of temperature along the channels is similar to that shown in FIGURE 4, but the overall temperature differential, that is the entire increase of temperature from beginning to end of the channel circuit, is much smaller. FIGURE 2 and FIGURE 5 are those we recognize as the preferred variant of our invention.

Figure 6:
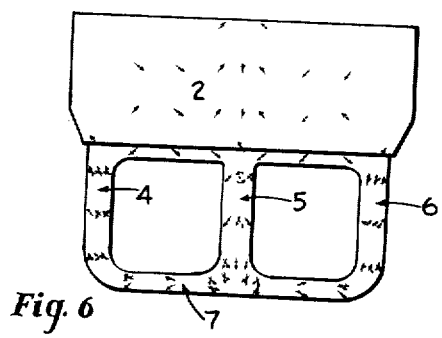
FIGURES 6 and 7 are views showing the flow pattern of the melt in the improved channels of FIGURES 1 and 2 respectively.
Figure 7:
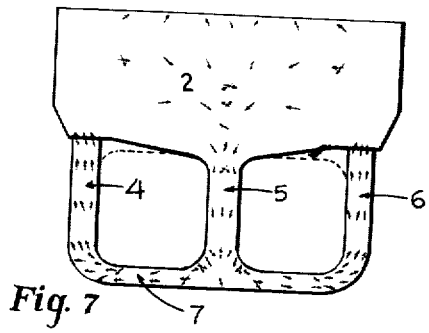

FIGURES 6 and 7 show the flow pattern observed in the embodiment of FIGURES 1 and 2 respectively. The small arrows show the direction of movement of the liquid metal in different points of the channels 4, 5, 6, and 7 and in the hearth 2. The movement is in general in the direction described above, viz., from the hearth into the central channel 5 and from there back through the lateral channels 4 and 5 into the hearth.

The flow patterns together with the temperature patterns shown and described herein clearly prove that unidirectional flow has been achieved throughout the entire path of the melt in the channels and that no forces of any appreciable effect are exerted which prevent the flow from proceeding in a uniform path. Further, "hot spots" indicating stagnation of heat have been eliminated with the lowering of temperature differentials achieving in effect a progressive rise from the ingress point at the central channel to the egress point at the lateral channels and greater uniformity of temperature throughout the path, occasioned by the increase in velocity.

Figure 8:
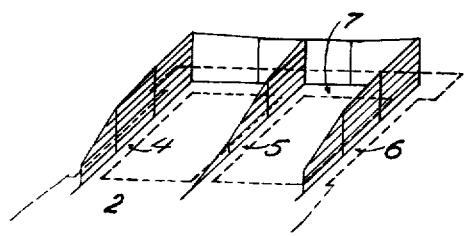
FIG. 8 is an isometric outline of the channel form of United States Letters Patent No. Re. 22,602 with the corresponding temperature patterns superimposed thereto.
Figure 9:
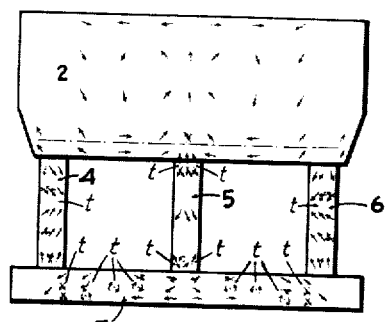
FIGURE 9 is a view showing the flow pattern of the melt in the channel form of FIGURE 8.

FIGURES 8 and 9 show the temperature pattern and the flow pattern observed in a furnace constructed with the channel form shown in United States Letters Patent No. Re. 22,602. The presentation, the denominations and the dimensions are the same as in FIGURES 4 to 7. The temperature scale is the same, viz. that shown in FIGURE 10.

It can be seen that in general the temperature differentials in this form are much higher than in the two embodiments of our invention, that the maximum temperature is already attained in the lower part of the central channel 5, that the same maximum temperature continues in the connecting channel 7 and in the lateral channels 4 and 6 and that it decreases within the lateral channels and before the egress end of the lateral channels into the hearth. It appears obvious from the teachings of our present invention that the high temperatures are due to lack of unidirection flow, to stagnation in the movement of the molten metal inside of the melting channels and to turbulence. All this is clearly indicated in the flow pattern, FIGURE 9. The arrows show a haphazard arrangement with no preferred direction. Eddies are encountered at different places indicated by the letter *t* (for turbulence).

A quantitative comparison between our invention and the prior art furnace referred to above can best be demonstrated in this tabulation:

| | Prior Art | Our Invention | |
| --- | --- | --- | --- |
| | | Fig. 1 Variant | Fig. 2 Variant |
| Amount of metal moved in lbs. per hr. | 26,900 | 38,400 | 64,200 |
| Percent increase (prior art=100) | | 43 | 138 |
| Temperature differential in Degrees F. | 59 | 41 | 23 |
| Percent decrease (prior art=100) | | 30.6 | 61 |

All these observations were made on one and the same furnace under equal conditions. The metal was lead. The temperature in the hearth averaged 745° F. The power input averaged 14 kw.

It will be noted in both forms of our invention described herein that a secondary loop consists of two substantially rectangular branches forced by the central channel 5, two lateral channels 4 and 6 substantially aligned with the central channel 5, a connecting channel 7, and a section of the hearth into which the three melting channels 4, 5 and 6 enter. These channels are provided each with a major portion of substantially uniform cross section and with substantially straight sides.

We have discovered that, curving of the lower edges of the lateral channels 4 and 6 and/or lower edges of the central channel 5 and/or lower edges of the connecting channel 7 is desirable, as repeatedly shown in the forms illustrated in FIGURES 1 to 7 inclusive; also that for proper functioning of the furnace herein illustrated a major but not the entire portion of the channels 4, 5, 6 and 7 should be of uniform cross section. It is preferred also that the cross section of the major portion of the connecting channel 7 should be at least of equal or larger cross section than the major portion of the lateral and central channels.

We have found that when straight lateral and central channels each having uniform cross section over its entire length, with no outflaring or curved ends, are employed together with a straight connecting channel, as shown in United States Letters Patent No. Re. 22,602 and illustrated in FIGURES 8 and 9 herein, a reduction in the velocity of the melt through the channels results causing differences in temperatures in the channels over and above the hearth temperature to be greater than when curved channel ends are employed. We have further ascertained, as shown in FIGURE 9, that the eddy currents set up as indicated are considerable in the channels of the form of the United States Letters Patent No. Re. 22,602 as shown in FIGURE 8 where different spots where turbulence occurs have been marked with the letter *t* (for turbulence). A comparison of the flow pattern in FIGURES 6 and 7 of our invention with the flow pattern of FIGURE 9 of the prior art clearly illustrates the improvement in the flow and the overcoming of any "bucking" tendencies in the flow of our invention. The flow pattern of our invention shows practically no eddies or turbulence.

We have discovered that a combination of an enlarged connecting channel 7, shown in United States Letters Patent No. Re. 22,602 with a rounding of the bottom edges of the central channel, produces a startling increase in the velocity of the flow through the channels. We have further discovered that the flow as described hereinbefore, contrary to accepted practice, is down rather than up the central channel and up rather than down the lateral channels, is virtually turbulence free as shown in FIGURES 6 and 7 and that the excess temperatures within the channels over the hearth temperatures are relatively low, substantially uniform in the channels, being slightly lower in the central channel 5 and in the connecting channel 7 than in the lateral channels 4 and 6, whereas in the prior art form of FIGURES 8 and 9 the temperatures are highest in the connecting channel 7 and in the adjacent portions of the central and lateral channels and are relatively high with respect to the hearth temperature.

Figure 3:
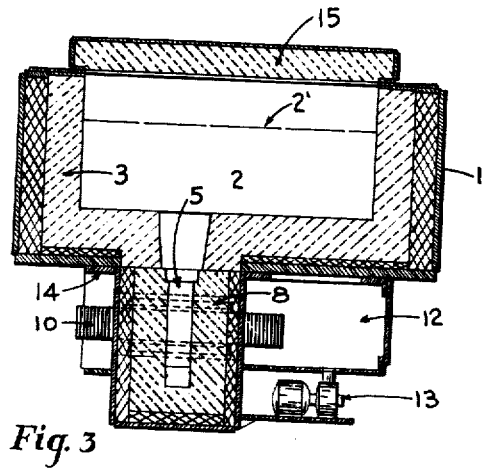
FIGURE 3 is a vertical sectional view of FIGURES 1 or 2 intersected at a plane designated with the letters x—x in FIGURES 1 and 2.

FIGURES 1, 2 and 3 as we have hereinbefore related represent variant forms of our improved invention. FIGURE 1 shows the refractory enclosed lateral channels 4 and 6, the refractory enclosed central channel 5 and the refractory enclosed connecting channel 7 of subtantially the same cross section throughout the major portion of their extent. The bottom edges of the channel 5 are curved outwardly towards the side edges and the outer edges of the connecting channel 7 and the inner bottom edges of the lateral channels 4 and 6 are correspondingly curved. In this form of our invention the upper inner edges of the lateral channels curve inwardly toward the upper ends of the central channel, which upper edges in the form shown in FIGURE 1 are straight and in the form of FIGURE 2 are slightly curved.

The channels 4, 5 and 6 are substantially parallel throughout the major portion of their extent.

In both forms of our invention since the magnetic field is concentrically and symmetrically distributed within the cross section of the central channel and there is nonsymmetric or eccentric distribution of the magnetic field in the lateral channels, the more violent electromagnetic pressure and larger current density which exists in the central channel is reduced by virtue of the use of curved bottom edges for the central and lateral channels and the flow of the liquid metal, in its unidirectional flow, will be assisted and augmented by virtue of the eccentric distribution of the magnetic field in the lateral channels.

Various changes may be made in the designs herein illustrated and described without however departing from the spirit of our invention and the scope of the appended claims.

We claim:

1. A method for melting metals in a twin coil induction furnace which is provided with a hearth, a secondary loop composed of a central melting channel, a pair of substantially vertical oppositely spaced lateral melting channels and a substantially horizontal bottom channel, the vertical and center channels entering into said hearth and said bottom channel, a primary transformer assembly threading said secondary melting loop adapted to create an electro-magnetic field and holding a metal charge in a molten state, advancing the inflow of the metal from the hearth into said central channel into the bottom channel, said flow being divided and being caused to flow back into the hearth through outflow from the lateral channels into the hearth, the temperature of the molten metal in said central channel being relatively lower than the temperatures of the molten metal in the bottom and lateral channels, the metal flow being maintained substantially without turbulence in said channels.

2. In an induction furnace of the submerged resistor type for melting metals, a hearth, a secondary loop adjacent said hearth, two primary coils threading the secondary loop, said secondary loop consisting of two substantially reactangular branches formed by a central melting channel, a pair of lateral melting channels and a bottom channel; the said central and lateral channels connecting the hearth and the bottom channel, each of the said channels having a major portion of its length of substantially uniform cross-section, each of said lateral channels having a substantially minor portion of its length provided with an inwardly curved bottom edge, means for the production of the circulation of the molten metal first through the central melting channel, the flow from said central channel into said bottom channel being evenly divided flowing through each said lateral channel back into said hearth, the temperatures of the molten metal within said central channel being maintained below the temperatures of the molten metal maintained in said bottom and lateral channels.

3. In an induction furnace of the submerged resistor type for melting metals, a hearth, a secondary loop adjacent said hearth, two primary coils threading the secondary loop, said secondary loop consisting of two substantially rectangular branches formed by a central melting channel, a pair of lateral melting channels and a bottom channel, the said central and lateral channels connecting the hearth and the bottom channel, each of the said channels having a major portion of its length of substantially uniform cross section, each of said lateral channels having a substantially minor portion of its length provided with an inwardly curved bottom edge, the central channel having a minor portion of its length provided with a pair of outwardly curved bottom edges, means for the production of the circulation of the molten metal first through the central melting channel, the flow from said central channel into said bottom channel being evenly divided flowing back into said hearth, the temperatures of the molten metal within said central channel being maintained below the temperatures of the molten metal maintained in said bottom and lateral channels.

4. In an induction furnace of the submerged resistor type for melting metals, a hearth, a secondary loop adjacent said hearth, two primary coils threading the secondary loop, said secondary loop consisting of two substantially rectangular branches formed by a central melting channel, a pair of lateral melting channels and a bottom channel, the said central and lateral channels connecting the hearth and the bottom channel, each of the said channels having a major portion of its length of substantially uniform cross section, each of said lateral channels having an inwardly curved bottom edge, the central channel having a pair of outwardly curved bottom edges, means for the production of the circulation of the molten metal first through the central melting channel, the flow from said central channel into said bottom channel being evenly divided flowing through each said lateral channel back into said hearth, the temperatures of the molten metal within said central channel being maintained below the temperatures of the molten metal maintained in said bottom and lateral channels.

5. In an induction furnace of the submerged resistor type for melting metals, a hearth, a secondary loop adjacent said hearth, two primary coils threading the secondary loop, said secondary loop consisting of two substantially rectangular branches formed by a central melting channel, a pair of lateral melting channels and a bottom channel, the said central and lateral channels connecting the hearth and the bottom channel, each of the said channels having a major portion of its length of substantially uniform cross section, each of said lateral channels being substantially parallel to but of greater length than said central channel and having a substantially minor portion of its length provided with an inwardly curved bottom edge, the central channel having a minor portion of its length provided with a pair of outwardly curved bottom edges, means for the production of the circulation of the molten metal first through the central melting channel, the flow from said central channel into said bottom channel being evenly divided flowing through each said lateral channel back into said hearth, the temperatures of the molten metal within said central channel being maintained below the temperatures of the molten metal maintained in said bottom and lateral channels.

6. In an induction furnace of the submerged resistor type for melting metals, a hearth, a secondary loop adjacent said hearth, two primary coils threading the secondary loop, said secondary loop consisting of two substantially rectangular branches formed by a central melting channel, a pair of lateral melting channels and a bottom channel, the said central and lateral channels connecting the hearth and the bottom channel, each of the said channels having a major portion of its length of substantially uniform cross section, each of said lateral channels having a substantially minor portion of its length provided with an inwardly curved bottom edge, the central channel having a minor portion of its length provided with a pair of outwardly curved bottom edges, each of the said central and lateral channels having the major portion of its length of relatively the same cross-sectional dimension as the other said channels, means for the production of the circulation of the molten metal first through the central melting channel, the flow from said central channel into said bottom channel being evenly divided flowing through each said lateral channel back into said hearth, the temperatures of the molten metal within said central channel being maintained below the temperatures of the molten metal maintained in said bottom and lateral channels.

7. In an induction furnace of the submerged resistor type for melting metals, a hearth, a secondary loop adjacent said hearth, two primary coils threading the secondary loop, said secondary loop consisting of two substantially rectangular branches formed by a central melting channel, a pair of lateral melting channels and a bottom channel, the said central and lateral channels connecting the hearth and the bottom channel, each of the said channels having a major portion of its length of substantially uniform cross section, each of said lateral channels having a substantially minor portion of its length provided with an inwardly curved bottom edge, the central channel having a minor portion of its length provided with a pair of outwardly curved bottom edges, each of the said central and lateral channels having the major portion of its length of relatively the same cross-sectional dimension as each of the other said channels, the bottom channel being of substantially greater cross-sectional dimension than the said central and lateral channels, means for the production of the circulation of the molten metal first through the central melting channel, the flow from said central channel into said bottom channel being evenly divided flowing through each said lateral channel back into said hearth, the temperatures of the molten metal within said central channel being maintained below the temperatures of the molten metal maintained in said bottom and lateral channels.

8. In an induction furnace of the submerged resistor type for melting metals, a hearth, a secondary loop adjacent said hearth, two primary coils threading the secondary loop, said secondary loop consisting of two substantially rectangular branches formed by a central melting channel, two lateral melting channels and a bottom channel; the said central and lateral channels connecting the hearth and the bottom channel, each of the said channels having a major portion of its length of substantially uniform cross section, each of said lateral channels having a substantially minor portion of its length provided with an inwardly curved bottom edge, said lateral channels being relatively of greater length than said central channel, the central channel having a generally funnel-shaped entrance, wherein the molten metal is first circulated through the central melting channel, the flow of the molten metal from said central channel into said bottom channel being evenly divided flowing through each said lateral channel back into said hearth, the temperatures of the molten metal within said central channel being maintained below the temperatures of the molten metal maintained in said bottom and lateral channels.

9. In an induction furnace of the submerged resistor type for melting metals, a hearth, a secondary loop adjacent said hearth, two primary coils threading the secondary loop, said secondary loop consisting of two substantially rectangular branches formed by a central melting channel, two lateral melting channels and a bottom channel; the said central and lateral channels connecting the hearth and the bottom channel, each of the said channels having a major portion of its length of substantially uniform cross section, each of said lateral channels having a substantially minor portion of its length provided with an inwardly curved bottom edge, said lateral channels being relatively of greater length than said central channel, the central channel having generally funnel-shaped entrance initiating adjacent the upper inner edges of said lateral channels and curving in at the upper edges of said central channel, wherein the molten metal is first circulated through the central melting channel, the flow of the molten metal from said central channel into said bottom channel being evenly divided flowing through each said lateral channel back into said hearth, the temperatures of the molten metal within said central channel being maintained below the temperatures of the molten metal maintained in said bottom and lateral channels.

10. In a method for melting metals in a twin coil induction furnace having a hearth, a secondary melting loop opening into said hearth, a primary transformer assembly threading said loop, said loop having a central channel, a bottom channel, and a pair of oppositely spaced lateral channels, which consists in placing a charge of metal within the hearth, moving said metal from the hearth first at a relatively low temperature of the molten metal through the said central channel and then back into the hearth through the lateral channels at relatively increased melting temperatures of the molten metal therein.

11. In a method for melting metals in a twin coil induction furnace having a hearth, a secondary melting loop opening into said hearth, a primary transformer assembly threading said loop, said loop having a central melting channel, a bottom channel, and a pair of oppositely spaced lateral melting channels, which consists in placing a charge of metal within the hearth, moving said metal from the hearth first at a relatively low temperature of the molten metal within the said central channel, moving the said molten metal back into the hearth at gradually increasing temperatures of the molten metal from the inlet afforded by the central channel to the egress from the lateral channels.

12. In a method for melting metals in a twin coil induction furnace having a hearth, a secondary melting loop opening into said hearth, a primary transformer assembly threading said loop, said loop having a central melting channel, a bottom channel, and a pair of oppositely spaced lateral melting channels, which consists in placing a charge of metal within the hearth, moving said metal from the hearth first at a relatively low temperature of the molten metal through the said central channel and then back into the hearth through the lateral channels under conditions of substantial uniformity of operating temperatures of the molten metal and obtaining a relatively great velocity of molten metal flow.

13. In an induction furnace of the submerged resistor type for melting metals, a hearth, a secondary loop adjacent said hearth, two primary coils threading the secondary loop, said secondary loop consisting of two substantially rectangular branches formed by a central melting channel, a pair of lateral melting channels and a bottom channel; the said central and lateral channels connecting the hearth and the bottom channel, each of the said melting channels having a major portion of its length of substantially uniform cross-section, each of said lateral channels having a substantially minor portion of its length provided with an inwardly curved bottom edge, the radius of said curved bottom edges being substantially less than one-half the diameter of each said primary coil.

References Cited in the file of this patent

UNITED STATES PATENTS

| | | |
|---|---|---|
| 1,031,257 | Greene | July 2, 1912 |
| 1,069,923 | Crafts | Aug. 12, 1913 |
| 1,293,164 | Moore | Feb. 4, 1919 |
| 2,519,941 | Tama | Aug. 22, 1950 |
| 2,541,841 | Tama | Feb. 13, 1951 |

UNITED STATES PATENT OFFICE
CERTIFICATE OF CORRECTION

June 4, 1963

Patent No. 3,092,682

Manuel Tama et al.

It is hereby certified that error appears in the above numbered patent requiring correction and that the said Letters Patent should read as corrected below.

Column 4, line 59, for "forced" read -- formed --; column 6, line 22, for "reactangular" read -- rectangular --.

Signed and sealed this 10th day of December 1963.

(SEAL)
Attest:
ERNEST W. SWIDER

Attesting Officer

EDWIN L. REYNOLDS

Acting Commissioner of Patents